July 5, 1927.
R. B. GRAY
1,634,460
WINDSHIELD WIPER
Filed March 15, 1926      2 Sheets-Sheet 1
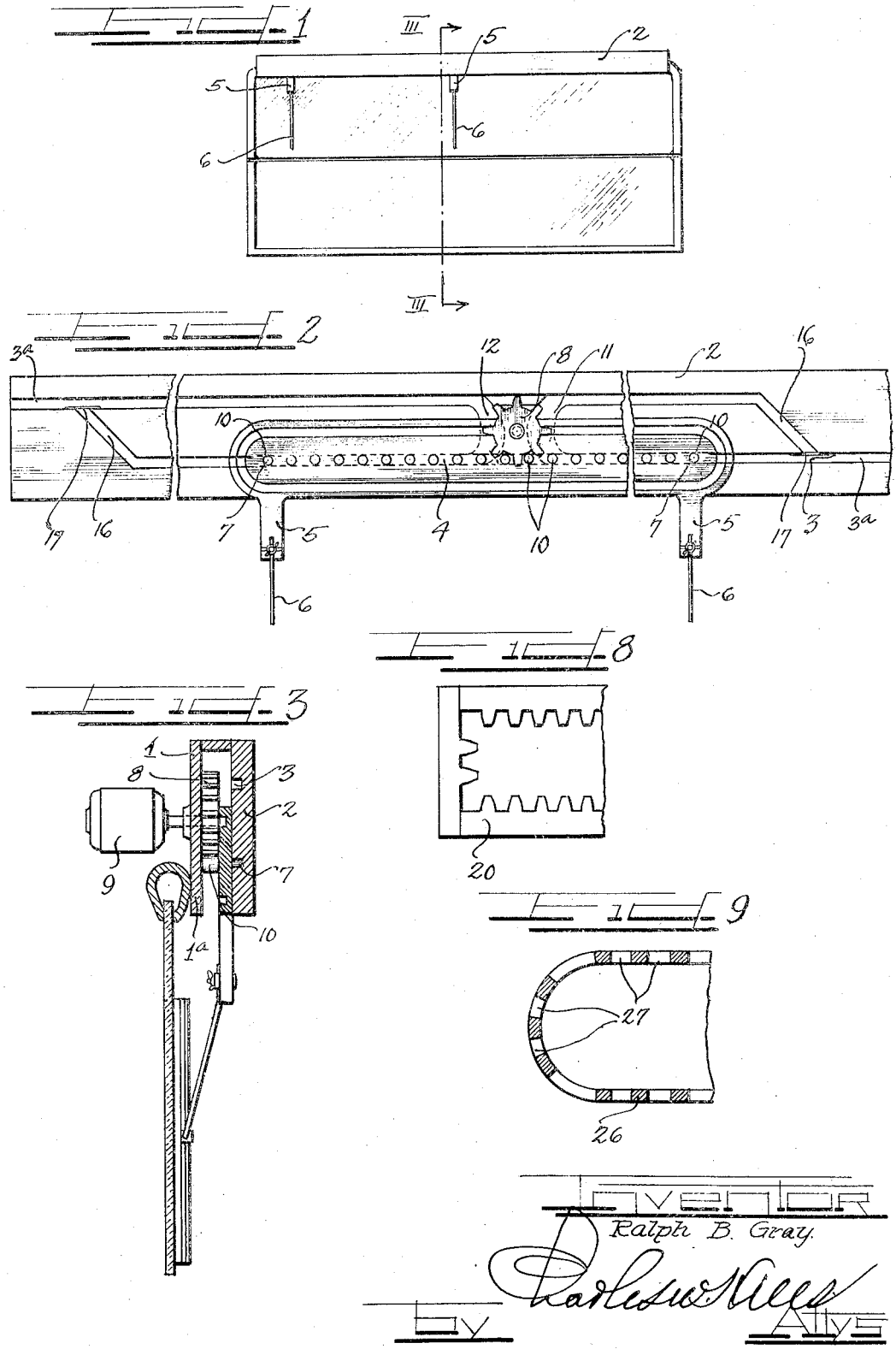
Inventor
Ralph B. Gray.

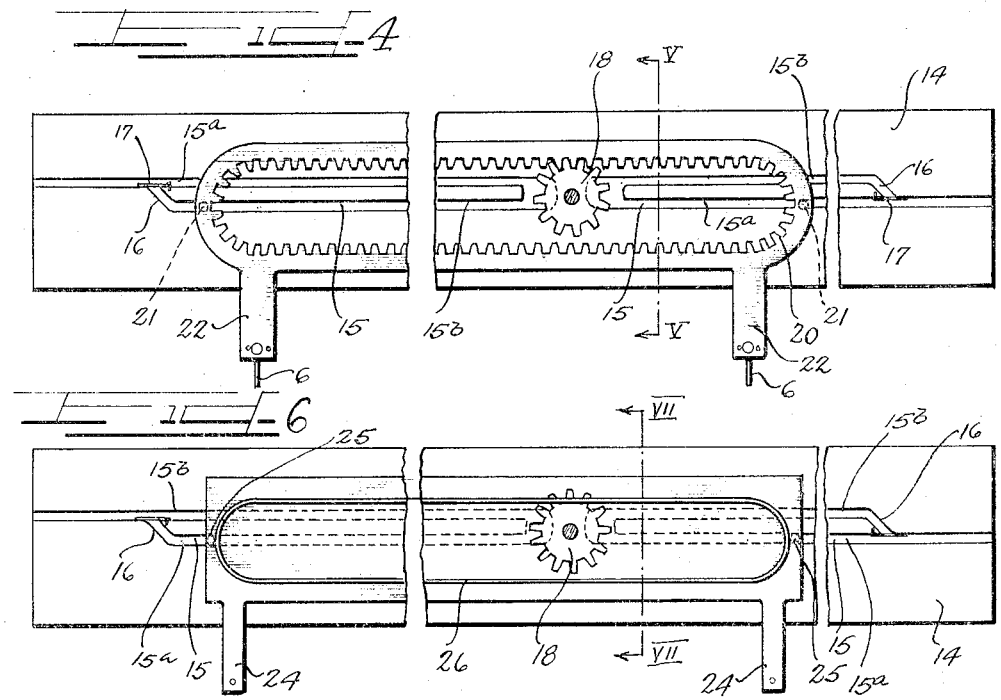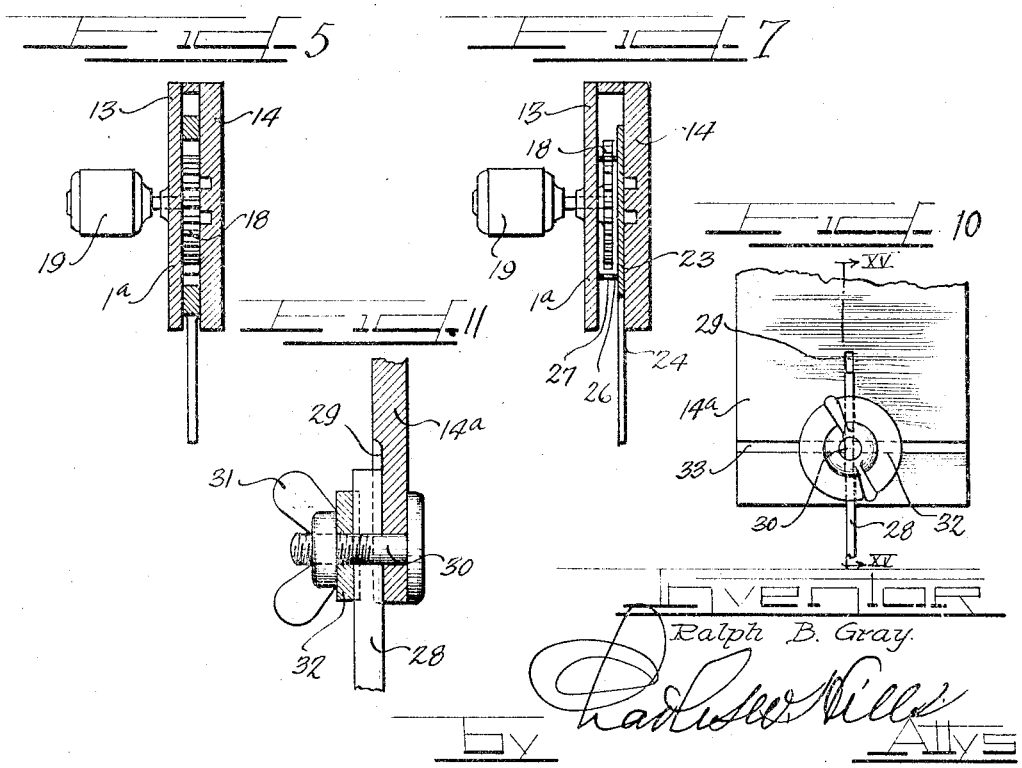

Patented July 5, 1927.

1,634,460

UNITED STATES PATENT OFFICE.

RALPH B. GRAY, OF CHICAGO, ILLINOIS.

WINDSHIELD WIPER.

Application filed March 15, 1926. Serial No. 94,669.

This invention relates to a windshield wiper and concerns itself with a structure in which the wiper travels in an oblong path over the windshield whereby a larger surface of the windshield is cleaned than in devices heretofore used, and in which the driving element is continuously rotated in the same direction for operating the wiper.

The invention comprises the novel structure and combinations hereinafter described and more particularly pointed out and defined in the appended claims.

In the accompanying drawings which illustrate certain preferred embodiments of this invention and in which similar reference numerals refer to similar features in the different views, Figure 1 is an elevational view of a windshield equipped with wiping mechanism involving this invention;

Figure 2 is a detached elevational view of the wiping mechanism;

Figure 3 is an enlarged sectional view taken substantially upon the line III—III of Figure 1;

Figure 4 is an elevational view of a modified form of wiping mechanism;

Figure 5 is an enlarged sectional view upon the line V—V of Figure 4;

Figure 6 is an elevational view of another modification of the invention;

Figure 7 is an enlarged sectional view upon the line VII—VII of Figure 6;

Figure 8 is a fragmentary elevational view of a modified form of the carriage shown in Figure 4;

Figure 9 is a fragmentary sectional view through the band rack shown in Figure 6;

Figure 10 is a fragmentary elevational view of the wiper carriage illustrating wiper supporting arms that may be rotated into horizontal position; and Figure 11 is an enlarged sectional view upon the line XI—XI of Figure 10.

Referring now especially to Figures 1 to 3 of the drawings, which illustrate one form that the invention may assume, it will be noted that a casing 1 is suitably supported adjacent the upper margin of the windshield, preferably in a plane on the outer side of the windshield. This casing comprises an outer stationary plate member 2 having a continuous or substantially oblong groove 3 upon its inner side. The groove comprises an upper branch and a lower branch connected by sloping paths or grooves 16 closed in one direction by leaf springs 19 each of which serves as a gate. Each branch extends a distance beyond the mouth of the path 16 extending from the other groove as indicated at 3ª. A traveling carriage 4 having depending arms 5 upon which windshield swipes 6 are secured, is supported for traveling movements in the oblong groove of the plate 2. To this end the carriage is provided with a pair of terminal pins 7 upon the outer side thereof which extend into the groove 3 which provide bearing means for the carriage as it travels in relation to the groove 3.

Motion is imparted to the carriage by means of a cog wheel 8 which is suitably supported in the casing 1 and which is operated by a motor 9 which may be supported from the casing in any suitable manner. The carriage is provided with a plurality of spaced members or studs 10 of cylindrical formation upon the inner side thereof, which are designed to be engaged by the cog wheel 8 for operating the carriage.

The upper and lower branches of the groove 3 are connected by suitable arcuate paths 11 and 12 through which the pins 7 may pass when the carriage moves from one branch of the groove to the other.

In the operation of the device shown in Figures 1 to 3 the cog wheel 8 is continuously rotated in one direction. Assuming that it is rotated in a clockwise direction it will move the carriage toward the left. As the left hand end pin 7 travels up the path 16 it will deflect the spring or gate 17 and enter the upper groove. The right hand end pin 7 will pass through the path 12. It will be noted that the terminal studs 10 are coaxial with the studs 7. Consequently the engagement of the cog wheel 8 with a terminal stud will elevate or propel the same through the path 12. When the carriage has been moved to the upper branch of the groove the spring 17 will act as a gate to close the upper end of the path 16 to prevent return of the end pin 7 into said path. The carriage will now travel to the right until it descends into the lower branch of the groove 3. In descending to the lower branch of the groove, the right hand pin 7 will of course travel through the path 16 and deflect the lower gate or spring 17, while the left hand pin 7 will travel down through the arcuate path 11. The lower spring 17 acts as a gate to prevent the right hand pin 7 from moving back up into the path 16. It will be noted that during the travel of the carriage it will be held or guided by the inner plate 1ª of the casing.

In the modification shown in Figure 4 there is a somewhat similar casing 13 which is similarly supported on the windshield. This casing comprises an inner plate 1ª and an outer plate 14 upon the inner surface of which are a pair of spaced substantially continuous or oblong grooves 15. Each groove consists of a branch 15ª and a branch 15ᵇ. The branch 15ᵇ connects with the branch 15ª by a sloping path 16 which is maintained closed with respect to one direction of travel of the carriage by a leaf spring 17 or other suitable gate. The branch 15ª of each groove extends beyond the branch 15ᵇ for a purpose that will later appear. A gear or cog wheel 18 is suitably supported upon the plate 1ª of the casing between said grooves and may be connected to a suitable motor 19 for driving the same. This gear 18 meshes with the internal teeth of an oblong or rectangular rack 20 provided with terminal studs 21 supported in the aforementioned grooves. The rack 20 is provided with depending arms 22 upon which the windshield swipes 6 are secured. Instead of making the rack 20 with arcuate ends as shown in Figure 4 it may be made with square ends as shown in Figure 8 which can be more readily manufactured.

It will be obvious that if the gear 18 is continuously rotated in one direction the rack 20 will travel in a continuous path, which is substantially oblong. As illustrated in the drawings, the gear 18 will be rotated in an anti-clockwise direction as viewed in Figure 4, whereby the rack 20 is caused to travel to the left. When the left hand stud 21 travels through the inclined path 16 it will lift the spring or gate 17 and enter the branch 15ª of the groove and may continue to travel onward in the extended portion of the groove 15ª until the right hand end of the rack has been elevated by gear 18 to bring its pin 21 into the upper branch of the groove. At this time the gear will come into engagement with the lower teeth on the rack 20 which will now be driven to the right, the right hand stud 21 passing through the sloping path 16 and past the gate 17 into the branch 15ª of the groove and the left hand pin 21 passing again into the lower branch of its groove as already explained. The gates 17 prevent a return of the studs 21 into the inclined paths 16.

In the modification of the invention shown in Figure 6, the casing is substantially the same as shown in Figure 5. There is shown a similar plate 14 provided with the continuous or oblong grooves 15 as above described and a cog wheel 18 mounted between said grooves and driven by a motor 19. The difference between the structures shown in Figures 4 and 6 is that in Figure 6 a different form of rack is used for carrying the windshield swipes. In referring to Figure 6 it will be noted that a plate 23 having suitable depending arms 24 is provided with terminal studs 25 which travel in the grooves 15. An oblong rack or band 26 provided with suitable spaced apertures 27 is permanently secured to the plate 23. The teeth of the gear wheel 18 engage in these apertures 27 and propel the plate 23 in an endless or oblong path. The operation of the plate 23 is substantially the same as the rack bar 20 above described. In fact, the oblong band 26 constitutes a rack which performs the same function as the rack bar 20 in the above described structure.

Instead of making the supporting arms 5, 22 and 24 integral with their carriage, they may be made adjustable as shown, in Figures 10 and 11. In referring to said figures it will be noted that the wiper supporting arm 28 is positioned in a vertical groove 29 in a carriage 14ª and clamped thereto by a bolt 30 and nut 31. A clamping washer 32 may be applied to the bolt. The nut 31 may be loosened and the arm 28 swung into horizontal position and inserted in a longitudinal groove 33 in the plate 14ª whereby the wiper and arm are removed from the glass of the shield.

It is characteristic of this invention that the operating means for the windshield wipers may continuously operate in the same direction, causing the wiping mechanism to travel in a continuous or substantially oblong path whereby a larger area of the windshield may be wiped and whereby a simple motor may be used for operating the same.

I am aware that many changes may be made and numerous details of construction may be varied through a wide range without departing from the principles of this invention and I therefore do not purpose limiting the patent granted hereon otherwise than necessitated by the prior art.

I claim as my invention:

1. A windshield wiper comprising a support having an endless guideway, a carriage, projections on said carriage extending into said guideway, means for alternately shifting said carriage longitudinally and vertically of the support, and wipers mounted on said carriage adapted to be moved longitudinally and vertically by said carriage.

2. A windshield cleaner comprising a support having an endless guideway therein, a carriage, projections on said carriage extending into said guideway, a plurality of swipes mounted on said carriage, means for adjusting said swipes with respect to said carriage, and a driving mechanism co-acting with said carriage adapted to move the carriage through a continuous path and cause the swipes to alternately move longitudinally and transversely of a surface to clean different areas thereof.

In testimony whereof I have hereunto subscribed my name.

RALPH B. GRAY.